United States Patent [19]

Thoma et al.

[11] 4,308,184

[45] Dec. 29, 1981

[54] HEAT CROSS LINKABLE POLYURETHANE COATING COMPOSITIONS

[75] Inventors: Wilhelm Thoma, Leverkusen; Gerhard Berndt, Monheim; Josef Pedain, Cologne; Walter Schröer, Leverkusen; Waldemar Kling, Kuerten-Bechen, all of Fed. Rep. of Germany

[73] Assignee: Bayer Aktiengesellschaft, Leverkusen, Fed. Rep. of Germany

[21] Appl. No.: 25,152

[22] Filed: Mar. 29, 1979

[30] Foreign Application Priority Data

Apr. 1, 1978 [DE] Fed. Rep. of Germany ....... 2814173

[51] Int. Cl.³ .............................................. C08L 75/04
[52] U.S. Cl. ............................ 260/29.2 TN; 156/239; 156/249; 156/307.1; 156/315; 260/29.4 R; 260/29.4 UA; 260/29.6 NR; 427/389.9; 427/412; 428/425.1; 428/904
[58] Field of Search ............... 260/29.2 TN, 29.4 R, 260/29.4 UA, 29.6 NR; 156/331, 307.1, 239, 249, 315; 428/424, 425, 425.1; 427/390, 412

[56] References Cited

U.S. PATENT DOCUMENTS

| | | | |
|---|---|---|---|
| B 170,961 | 8/1971 | Ballé | 260/29.4 VA |
| 3,228,820 | 1/1966 | Samson | 156/307.3 |
| 3,726,838 | 4/1973 | Ermer et al. | 528/67 |
| 3,755,261 | 8/1973 | Van Grelick | 525/330 |
| 3,756,992 | 9/1973 | Dieterich | 260/29.2 TN |
| 3,984,607 | 10/1976 | Thoma et al. | 428/425 |
| 4,035,213 | 7/1977 | Thoma et al. | 156/231 |
| 4,160,686 | 7/1979 | Niederdellmann et al. | 156/331 |

FOREIGN PATENT DOCUMENTS 2314512 10/1974 Fed. Rep. of Germany .
2431846 1/1976 Fed. Rep. of Germany .
15231488 8/1978 United Kingdom .

*Primary Examiner*—Theodore E. Pertilla
*Attorney, Agent, or Firm*—Gene Harsh; Lawrence S. Pope; Thomas W. Roy

[57] ABSTRACT

The present disclosure is concerned with solvent free or very low solvent coating compositions suitable for use on flexible sheet form substrates particularly textile substrates. The composition comprises a urethane group-containing prepolymer with OH or $CONH_2$ terminal groups mixed with a urea or melamine formaldehyde resin and a stable aqueous polymer dispersion or solution. The composition may also contain small amounts of an organic solvent. The coating can be applied to the substrate by direct or reverse coating techniques.

15 Claims, No Drawings

4,308,184

HEAT CROSS LINKABLE POLYURETHANE COATING COMPOSITIONS

FIELD OF THE INVENTION

This invention relates to compositions cross-linkable by heating to form polyurethane plastics for coating substrates, preferably textile sheet-form materials, in particular by the reverse coating process. For ecological and economic reasons, the coating compositions are free from organic solvent or contain at most 10% by weight of organic solvent. They consist essentially of linear and/or branched urethane-group-containing prepolymers having terminal OH— and/or CO—NH$_2$— and/or ketoxime-urethane groups, aqueous dispersions of urethane polymers, vinyl polymers and/or diene polymers and/or aqueous polymer solutions and of urea and/or melamine formaldehyde resins as latent crosslinkers. The chain-extending or crosslinking reaction takes place at an elevated temperature in a coating tunnel after the coating has been applied to a substrate.

BACKGROUND OF THE INVENTION

It has long been known that textile materials, such as woven fabrics, knitted fabrics or non-woven fabrics, can be coated with solutions of polyurethanes by the direct or reverse coating process for the purpose of producing artificial leather and similar products. The coating solutions may contain either urethane prepolymers, which are reacted with polyfunctional crosslinking agents in order to establish their final plastic properties and product qualities (so-called two-component polyurethanes), or high-polymer polyurethanes which already have all their plastic properties (so-called one-component polyurethanes). The coatings thus obtained are used for the production of outer clothing, purses and handbags, shoe upper material, awnings, blinds, upholstered goods and many other articles.

It is known from German Offenlegungsschrift No. 2,431,846 that polyurethanes can be processed from solution in a mixture of water and a single organic solvent, for example dimethyl formamide, in order to enable the solvent to be recovered and recycled for ecological and economic reasons. It is also known (German Offenlegungsschrift Nos. 1,770,068 and 2,314,512) that coatings can be produced from ionic or non-ionic polyurethane dispersions which are thickened with water-soluble or water-swellable polymers to establish the viscosity required for spreading.

German Offenlegungsschrift No. 2,448,133 describes the coating of textiles using reactive polyurethane systems which are free from volatile solvents, such as dimethyl formamide, methylethyl ketone, toluene, etc., but instead contain, for example, PVC plasticizers of the phthalic acid ester type. The advantage of reactive systems such as these lies in the absence of conventional solvents. This advantage, however, is offset by the presence of PVC plasticizers which effloresce or exude from the coatings and make the coated articles sensitive to dry cleaning. In one particular process of this type (U.S. Pat. No. 3,755,261), complex salts of 4,4'-diaminodiphenyl methane are dispersed as latent crosslinkers in PVC plasticizers. The disadvantage of this process lies particularly in the toxic properties of 4,4'-diaminodiphenyl methane. Another serious disadvantage of conventional solvent-free PUR-reactive systems lies in the deep penetration of the coating composition into the textile substrate, resulting in the formation of coated articles having a hard feel and an unattractive grain.

According to the prior art (U.S. Pat. No. 3,228,820), this disadvantage is partly obviated by the addition of thixotropic agents based on finely disperse silica. Apart from the considerable amount of energy required for dispersion, however, it is also generally necessary where this procedure is adopted to add organic solvents for adjusting the necessary working viscosity.

SUMMARY OF THE INVENTION

Accordingly, the present invention relates to coating compositions comprising:

(a) from about 50 to 95% by weight, preferably from about 60 to 85%, by weight of an optionally branched urethane-group-containing prepolymer having an average molecular weight of from about 500 to 25,000, preferably from about 2000 to 10,000 and, with particular preference, from about 3000 to 8000 and containing from about 2 to 8, preferably from about 2 to 4, and, with particular preference 2 or 3 terminal OH— and/or CONH$_2$— and/or ketoxime-urethane groups, (b) from about 2 to 20% by weight, preferably from about 5 to 15% by weight, of a urea- and/or melamine-formaldehyde resin, (c) from about 3 to 50% by weight, preferably from about 10 to 30% by weight, of a stable aqueous polymer dispersion and/or aqueous polymer solution having a solids content of from about 20 to 70 % by weight, preferably from about 30 to 50% by weight and, with particular preference, around 40% by weight, and (d) from about 0 to 10% by weight, preferably from about 0 to 6% by weight of an organic solvent.

According to the present invention, coating compositions whch are completely free from organic solvents are particularly preferred. The concentrations of the polymer dispersion or solution are generally selected in such a way that the coating composition contains from about 1 to 25% by weight, preferably from about 5 to 15% by weight, of the polymer and from about 2 to 30% by weight, preferably from about 10 to 25% by weight, of water.

The present invention also relates to a process for coating substrates in which a coating composition based on a reactive system of a urethane-group-containing polymer and a urea-formaldehyde and/or melamine-formaldehyde resin is applied to the substrate by the direct or reverse coating process and is hardened while shaping or forming, characterized in that the compositions according to the present invention are used for coating and are hardened by heating the coated substrate to a temperature of from about 110° to 180° C., preferably to a temperature of from about 140° to 160° C.

DETAILED DESCRIPTION OF THE INVENTION

It may be regarded as surprising that the prepolymers, which are generally incompatible with pure water, can be mixed with aqueous polymer dispersions and/or aqueous polymer solutions up to a ratio by weight of about 1:1 to form stable emulsions which retain their spreadability and their uniform levelling over prolonged periods. In addition, the film-forming capacity of the pastes thus obtained is also distinctly improved.

It is particularly surprising that the coating pastes according to the present invention do not penetrate into textile substrates. As already mentioned, this penetration of the coating compositions into the textile in conventional processes leads to a hard feel, poor grain and weak adhesion of the coated articles.

The urethane prepolymers containing terminal OH— and/or CONH$_2$— and/or ketoxime-urethane groups (component a of the coating compositions according to the present invention) are obtained from linear or branched compounds containing from about 2 to 8, preferably from about 2 to 4 and, with particular preference, 2 or 3 hydroxyl groups (for example hydroxy polyesters, but particularly hydroxy polyethers) and having molecular weights of from about 400 to 10,000 more particularly from about 1000 to 4000, and an excess of aromatic and/or cycloaliphatic and/or aliphatic polyisocyanates and the following alkanolamines (A) and/or hydroxy carbazinic acid esters (B) and/or hydroxy carboxylic acid hydrazides (C) and/or hydroxy carbamic acid esters (D) and/or hydroxy carboxylic acid amides (E) and/or aminocarboxylic acid amides (F) and/or ammonia and/or urea and/or ketoximes (G):

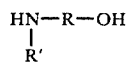  (A)

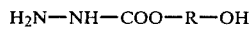  (B)

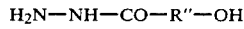  (C)

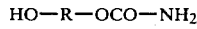  (D)

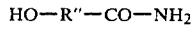  (E)

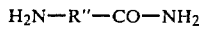  (F)

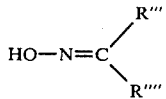  (G)

In formulae (A) to (G) above, represents an optionally branched alkylene radical containing from 2 to 6, preferably 2 or 3 carbon atoms;

represents hydrogen, —R—OH or an alkyl radical containing from 1 to 6, preferably 1 or 2, carbon atoms;

represents an optionlly branched alkylene radical containing from 1 to 10, preferably from 3 to 5 carbon atoms; and and R''' represent $C_1$–$C_6$, preferably $C_1$–$C_4$-alkyl radicals, $C_6$–$C_{10}$, preferably $C_6$-aryl radicals or R''' and R'''' together represent an alkylene radical containing from 4 to 10 carbon atoms, preferably 4 or 5 carbon atoms.

An NCO/OH-equivalent ratio of from about 1.3:1 to 2.5:1 is preferably maintained in the synthesis of the prepolymers, and NCO/OH-equivalent ratio of from about 1.8:1 to 2.1:1 being particularly preferrred, so that the terminally modified urethane prepolymers contain from about 0.3 to 6.0% by weight, preferably from about 1.0 to 3.0% by weight of terminal OH-groups and/or from about 0.6 to 10.0% by weight, preferably from about 1.2 to 5.0% by weight of terminal CONH$_2$-groups and/or from about 2.0 to 40.0 by weight, preferably from about 5.0 to 20.0% by weight of terminal ketoxime-urethane groups.

According to the present invention, terminal "ketoxime-urethane" groups are groups corresponding to the following general formula:

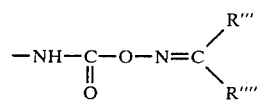

The polyesters and/or polyethers used for producing the urethane prepolymers are made up of known units, such as dialcohols and trialcohols, dicarboxylic and tricarboxylic acids, hydroxy carboxylic acids, lactones, ethylene oxide, 1,2-propylene oxide, 1,2-butylene oxide or tetrahydrofuran or mixtures thereof. It is preferred to use polyethers and polyesters having a melting point below about 40° C., polyethers and polyesters having a melting point below about 20° C. being particularly preferred.

Polyhydroxyl compounds suitable for use in the production of the coating compositions according to the present invention are described in detail in German Offenlegungsschrift Nos. 2,431,846 and 2,402,840 (U.S. Pat. No. 3,984,607) and in German Auslegeschrift No. 2,457,387 (U.S. Pat. No. 4,035,213). Polyisocyanates suitable for use in the production of the urethane prepolymers containing terminal OH—and/or CONH$_2$—and/or ketoxime-urethane groups are also described in detail in these publications.

Suitable alkanolamines (A) are inter alia ethanolamine, N-methyl ethanolamine, 1,2-propanolamine, 1,3-propanolamine, N-methyl-1,2-propanolamine, diethanolamine and 1,2- or 1,3-dipropanolamine; suitable hydroxy carbazinic acid esters (B) are, for example hydroxyethyl carbazinic acid esters and 2- or 3-hydroxy carbazinic propyl esters; suitable hydroxy hydrazides (C) are glycolic acid hydrazide, lactic acid hydrazide, γ-hydroxybutyric acid hydrazide, δ-hydroxyvaleric acid hydrazide, ε-hydroxy caproic acid hydrazide and others. Terminal CONH$_2$—groups are obtained in the prepolymers with inter alia hydroxy urethanes (D), such as hydroxyethyl urethane, 2- or 3-hydroxy propyl urethane and others; hydroxyamides (E), such as glycolic acid amide, lactic acid amide, γ-hydroxybutyric acid amide, δ-hydroxy valeric acid amide, ε-hydroxy caproic acid amide and others; aminoamides (F) such as glycine amide, β-alanine amide, γ-aminobutyric acid amide, δ-aminovaleric acid amide, ε-aminocaproic acid amide and others; also ammonia and urea.

In the production of the prepolymers containing terminal ketoxime-urethane groups, masking agents used for the NCO-groups of the prepolymers are inter alia ketoximes of hydroxylamine and ketones such as acetone, methylethyl ketone, diethyl ketone, methyl propyl ketone, methyl-isopropyl ketone, methylisobutyl ketone, cyclohexanone, acetophenone or benzophenone.

According to the present invention, it is particularly preferred to use prepolymers of diethylene glycol adipates and/or polyhydroxy propylene glycol ethers, tolylene diisocyanate or isophorone diisocyanate and 1,2-hydroxypropyl urethane and/or 1,2-hydroxypropyl carbazinic acid esters or methylethyl ketoxime (butanone oxime).

The coating pastes according to the present invention, preferably coupling coat pastes contain from about 3 to 50% by weight of aqueous polymer dispersions and/or aqueous polymer solutions. Suitable polymer dispersions are, for example, aqueous polyurethane dispersions, aqueous latices of homopolymers and copolymers of vinyl monomers and, optionally, dienes and also aqueous dispersions of nitrocellulose solutions of the type known from the dressing of leather.

The polyurethane dispersions may contain anionic, cationic or non-ionic dispersion centers and, optionally, even external emulsifiers.

Suitable PUR-dispersions are described, for example, by D. Dieterich et al. in J. Oil Col. Chem. Assoc. 1970, 53, pages 363-379, in Die Angewandte Makromolekulare Chemie, 1972, 26, pages 85-106, in Angewandte Chemie 1970, 82, pages 53-63 and in German Offenlegungsschrift Nos. 2,550,860; 1,495,745 (U.S. Pat No. 3,479,310 incorporated herein by reference); 1,495,770 (U.S. Pat. No. 3,535,274 incorporated herein by reference); 1,495,847 (Canadian Pat. No. 764,009); 1,770,068 (U.S. Pat. No. 3,756,992 incorporated herein by reference) and 2,314,512.

Preferred polyurethane dispersions are polyurethane dispersions of polyhydroxy polyesters, hexane and/or isophorone diisocyanate and ethylene diamine ethyl sulphonate corresponding to the following formula:

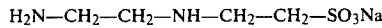

The polymer latices suitable for use in accordance with the present invention may be synthesized, for example, from the following monomers: acrylic and methacrylic acid esters of methanol, ethanol or butanol; vinyl chloride, vinylidene chloride, vinylacetate, vinyl alcohol groups (by hydrolysis of vinylacetate residues in polymers), ethylene, propylene, acrylonitrile, styrene, butadiene, isoprene, chloroprene; also acrylamide, M-methylol acrylamide, methacrylamide, acrylic acid and methacrylic acid. Polymer latices of this type are described, for example, in U.S. Pat. No. 3,869,413 incorporated herein by reference and in German Offenlgungsschrift Nos. 2,550,832; 2,627,073 and 2,627,074.

Preferred polymer dispersions are polymer dispersions of acrylic acid butyl ester, styrene, acrylonitrile, acrylamide, acrylic acid and N-methylol acrylamide and, optionally, butadiene.

In addition to the polymer dispersions mentioned by way of example, the urethane prepolymers containing terminal OH— and/or CONH$_2$— and/or ketoxime-urethane groups may also be blended with water-soluble or water-swellable polymers, for example, with aqueous solutions of casein, caprolactam-modified casein, gelatin, cellulose ethers, polyacrylamide, polyvinyl alcohol, polyvinyl pyrrolidone, polyacrylic acid or alginates.

The coating pastes according to the present invention are crosslinked with from about 2 to 20% by weight, preferably with from about 5 to 15% by weight of urea- and/or malamine-formaldehyde resins.

Crosslinking agents of this type are known in the coating industry and are also described, for example, in German Auslegeschrift Nos. 2,457,387 (U.S. Pat. No. 4,035,213 incorporated herein by reference) and 1,719,324 and, in particular, in U.S. Pat. No. 3,242,230 incorporated herein by reference.

As already mentioned, the coating compositions according to the present invention are particularly suitable for coating sheet-form textiles, leather or skiver. The quantities in which they are applied may vary within wide limits and, in general, amount to from about 30 to 300 g/m$^2$, preferably from about 40 to 100 g/m$^2$. The coating compositions may be applied both by the direct coating process and also, preferably, by the reverse coating process.

Small quantities (up to about 10% by weight, preferably from about 1 to 5% by weight, based on formaldehyde resin) of acids such as phosphoric acid, acid salts of phosphoric acid, maleic acid or p-toluene sulphonic acid, may be added as catalysts for cross-linking the formaldehyde resins, as is known. Both the formaldehyde resin and also the catalyst are preferably used in the absence of organic solvents (i.e. in pure form or in aqueous solution).

Examples of organic solvents which may be present in the coating compositions according to the present invention (for example as solvent for the catalyst) in quantities of up to about 10% by weight, are isopropanol, butanol, dimethyl formamide, ethylacetate, butylacetate, cyclohexanone, methylethyl ketone, ethylene glycol monomethyl ether and monoethyl ether and acetic acid esters thereof.

It is, of course, also possible to apply conventional coating solutions or pastes as further layers to the substrate in addition to the coating compositions according to the present invention. Conventional formulations such as these are described in detail as surface or coupling coats, for example in German Auslegeschrift No. 2,457,387 (U.S. Pat. No. 4,035,213).

The coating pastes according to the present invention are preferably used as coupling coats in the reverse coating of textiles, leather or skiver. the surface coat (preferably a paste according to the present invention or even a conventional formulation) is initially applied to a suitable intermediate support (for example a steel band, a separating paper, a silicone matrix and the like) in a thickness of form about 20 to 80 g/m$^2$ and dried in a drying tunnel. The coupling coat is then applied to the dried surface coat in a thickness of from about 30 to 100 g/m$^2$, the substrate applied, the coating heated at around 110° to 180° C., preferably at from about 140° to 160° C. in another drying tunnel, and the coated substrate withdrawn from the separation support.

As already mentioned, however, the coating pastes according to the present invention may also be directly applied to the textile substrate by the direct coating process rather than indirectly by the so-called transfer process.

In transfer or direct coating, the pastes are applied by a known method using doctor kiss coaters, blanket coaters, reverse roll coaters, etc. In addition, it is particularly advantageous to use the modern techniques of screen printing and engraved roller printing for highly concentrated coating pastes.

The coating pastes according to the present invention of urethane prepolymers and aqueous polymer dispersions and/or aqueous polymer solutions and urea- and/or melamine-formaldehyde resins as crosslinkers may contain various known additives such as powdered pigments, formed pigments, other coloring agents, UV-stabilizers, antioxidants, crosslinking catalysts, feel-influencing agents such as silicones, cellulose esters, fillers such as chalk, kaolin or heavy spar, surface-active silica gels and others.

Unless otherwise indicated, the quantities quoted in the following Examples represent parts by weight and % by weight.

The following starting components are used for producing the prepolymers containing terminal OH— and/or CONH$_2$— and/or ketoxime-uretahne groups:

Polyol 1: propylene-glycol-started polypropylene glycol ether (OH-number 56, average molecular weight 2000);

Polyol 2: Bisphenol-A-started polypropylene glycol ether (OH-number 200);

Polyol 3: Trimethylol propane-started polyether of propylene oxide and approximately 20% of ethylene oxide (OH-number 28, average molecular weight 6000);

Polyol 4: Polyester of adipic acid and diethylene glycol (OH-number 45, average molecular weight 2500);

TDI/80: Tolylene diisocyanate (mixture of 2,4- and 2,6-isomers in a ratio of 2:8);

IPDI: 3,3,5-trimethyl-5-isocyanatomethyl cyclohexyl isocyanate;

MDI: 4,4'-diphenyl methane diisocyanate

Production of the prepolymers containing terminal OH— and/or CONH$_2$— and/or ketoxime-urethane groups (I) 800 g of polyol 1 and 139 g of TDI/80 are mixed in a stirrer-equipped vessel and heated, with stirring to 80° C. After a reaction time of from 5 to 6 hours at 80° C., a constant NCO-content of approximately 3.3% is reached. The mixture is cooled to room temperature and 800 g of the mixture are run, with stirring, into a solution of 45 g of N-methyl ethanolamine in 100 g of acetone. The components are left to react without further heating until no more NCO-groups can be detected by IR-spectroscopy. The acetone is distilled off in a water jet vacuum. Dilution with methyl glycol ether acetate to 99% gives a viscosity of 100,000 mPas at 25° C. (ii) 782 g of polyol 1 and 136 g of TDI/80 are mixed in a stirrer-equipped vessel and heated, with stirring, to 80° C. After a reaction time of from 5 to 6 hours at 80° C., a constant NCO-content of approximately 3.3% is reached. This prepolymer is cooled to room temperature, after which 800 g of the NCO-prepolymer are run, with stirring, into a solution of 66 g of diethanolamine in 100 g of acetone. The components are left to react without further heating until no more NCO-groups can be detected by IR-spectroscopy. The acetone is distilled off in a water jet vacuum. Dilution with ethylene glycol monomethyl ether to 98% gives a viscosity of 70,000 mPas at 25° C.

(III) 778 g of polyol 4 and 138 g of IPDI are mixed in a stirrer-equipped vessel and heated, with stirring, to 80° C. After a reaction time of 5 hours at 80° C., a constant NCO-content of 2.8% is reached. A solution of 84 g of hydrazine carboxylic acid hydroxy propyl ester in 100 g of isopropanol is added to this NCO-prepolymer at room temperature, followed by stirring at room temperature until no more NCO-groups can be detected by IR-spectroscopy. The 91% prepolymer solution thus obtained is slightly cloudy and has a viscosity of 200,000 mPas at 25° C.

(IV) 778 g of polyol 4 and 138 g of IPDI are mixed in a stirrer-equipped vessel and heated, with stirring, for 5 hours to 80° C. A solution of 74 g of hydrazine carboxylic acid hydroxy ethyl ester in 100 g of ethylene glycol monomethyl ether is added at room temperature to the prepolymer thus obtained which contains 2.8% of NCO-groups. The further procedure is the same as described in (III). The resulting prepolymer solution in ethylene glycol monomethyl ether is slightly cloudy and has a viscosity of 300,000 mPas at 25° C.

(V) 773 g of polyol 1 and 134 g of TDI/80 are mixed in a stirrer-equipped vessel and heated, with stirring, to 80° C. After a reaction time of from 5 to 6 hours at 80° C., a constant NCO-content of approximately 3.6% is reached. 93 g of 2-hydroxypropyl urethane are added all at once to this NCO-prepolymer and the mixture is left to react at 80° C. until no more NCO-groups can be detected by IR-spectroscopy. Dilution with dimethyl formamide to 98% gives a viscosity of approximately 40,000 mPas at 25° C.

(VI) 785 g of polyol 4 and 139 g of IPDI are mixed in a stirrer-equipped vessel and heated, with stirring, to 80° C. After a reaction time of from 5 to 6 hours, a constant NCO-content of approximately 2.8% is reached. 75 g of 2-hydroxypropyl urethane are added all at once to this NCO-prepolymer, followed by stirring at 80° C. until no more NCO-groups can be detected by IR-spectroscopy. Dilution with methylethyl ketone to 92% gives a viscosity of approximately 40,000 mPas at 25° C.

(VII) 1500 g of polyol 1 and 333 g of IPDI are mixed in a stirrer-equipped vessel and heated, with stirring, to 80° C. After a reaction time of from 5 to 6 hours, a constant NCO-content of approximately 3.4% is reached. 128 g of 2-hydroxypropyl urethane are added all at once to this NCO-prepolymer, followed by stirring at 80° C. until no more NCO-groups can be detected by IR-spectroscopy. Dilution with ethylene glycol monoethyl ether to 97% gives a viscosity of 40,000 mPas at 25° C.

(VIII) 810 g of polyol 1 and 141 g of TDI/80 are mixed in a stirrer-equipped vessel. The mixture is left to react, with stirring, at 80° C. until a constant NCO-content of approximately 3.3% is reached (this takes from 5 to 6 hours). After heating to 120° C., 49 g of urea are added and the mixture is left to react at that temperature until no more NCO-groups can be detected by IR-spectroscopy. Dilution with cyclohexanone to 92% gives a viscosity of approximately 100,000 mPas at 25° C.

(IX) 1600 g of polyol 3 and 200 g of polyol 2 are dehydrated for 30 minutes in a water jet vacuum. The polyol mixture is cooled to 40° C. and 200 g of MDI and 140 g of TDI/80 are added. This is followed by reaction for 3 to 4 hours at 60° C. until an NCO-content of 2.9% is reached. When this NCO-content has been reached, 129 g of butanone oxime are added dropwise and the mixture is left to react at 80° C. until no more NCO-groups can be detected by IR-spectroscopy. A viscosity of from 60,000 to 65,000 mPas at 25° C. is adjusted by the addition of 22 g of methylethyl ketone and 22 g of isopropanol. The masked NCO-group content amounts to 2.17%.

A viscosity of approximately 80,000 mPas is obtained by diluting the masked prepolymer with 115 g of dioctyl phthalate instead of methylethyl ketone and isopropanol.

(X) 1500 g of polyol 1 and 333 g of IPDI are mixed in a stirrer-equipped vessel and heated, with stirring, to 80° C. After a reaction time of from 5 to 6 hours at 80° C., a constant NCO-content of 3.4% is reached. A solution of 180 g of hydrazine carboxylic acid hydroxyethyl ester (carbazinic acid hydroxyethyl ester) in 200 g of ethylene glycol monomethyl ether is added to this NCO-prepolymer at room temperature, followed by stirring at room temperature until no more NCO-groups can be detected by IR-spectroscopy. The 91% solution in ethylene glycol monomethyl ether is slightly cloudy and has a viscosity of 48,000 mPas at 25° C.

EXAMPLES

EXAMPLE 1

The surface coat solution D1 is a 25% solution of a polycarbonate polyester urethane in dimethyl formamide having a viscosity of 10,000 mPas at 25° C. The polycarbonate polyester urethane is obtained by the melt condensation of 1000 g (0.5 mol) of hexane diol polycarbonate, 1125 g (0.5 mol) of a 1,4-butane diol adipate, 270 g of 1,4-butane diol (3.0 mols) and 1000 g of 4,4′-diphenyl methane diisocyanate (4.0 mols). The solution of the aromatic one-component polyurethane in dimethyl formamide is pigmented with 8% of a standard commercial-grade pigment paste consisting of an iron oxide colored pigment, polyacrylate and cyclohexanone. The pigmented surface coat solution D1 is initially applied to a separation paper by doctor kiss coating in a coating machine comprising two spreading units and two drying tunnels (quantity applied, wet: 120 g/m$^2$). The dimethyl formamide evaporated during the passage through the first tunnel is delivered to a recovery unit. The coupling coat paste H1 is similarly applied in a quantity (wet) of 50 g/m$^2$ in the second spreading unit, the textile web (a raised cotton fabric weighing 160 g/m$^2$) is applied and the crosslinking reaction in the coupling coat is induced in the second drying tunnel at a temperature on entry of 140° C. and a temperature on exit of 160° C.

The coupling coat paste H1 consists of 1000 g of the prepolymer (VI) containing terminal CO—NH$_2$-groups, 300 g of a 40% aqueous acrylate dispersion based on butylacrylate, styrene and N-methylolacrylamide (®Acralen ATR of Bayer AG, Germany), 50 g of a solvent-free melamine-formaldehyde resin (®Cymel 301 of American Cyanamide Corp.) and 20 g of a 20% solution of 4-toluene sulphonic acid in isopropanol.

The coatings produced using the coupling coat paste H1 according to the present invention show high flexural strength, firm adhesion and a soft feel, whereas coatings produced for comparison with the coupling coat paste V1 (having the same composition as H1, but without the added dispersion) have distinctly weaker flexural strength, extremely poor adhesion and a stiff feel.

EXAMPLE 2

The surface coat solution D2 is a 30% solution of a polyester urethane in dimethyl formamide/methylethyl ketone (1:1) having a viscosity of 30,000 mPas at 25° C. The polyester urethane was obtained from 1800 g (2.0 mols) of a 1,4-butane diol adipate, 174 g of TDI/80 (1.0 mol), 186 g of ethylene glycol (3.0 mols) and 1000 g of 4,4′-diphenyl methane diisocyanate (4.0 mols). After pigmenting, a surface coat of 30 g solids per square meter is produced under known conditions on a separation paper in the same way as described in Example 1. After the coupling coat paste H2 has been applied, the textile web is applied in the same way as described in Example 1.

The coupling coat paste H2 consists of 1000 g of the prepolymer (VI) containing terminal CO—NH$_2$-groups, 300 g of a 50% aqueous acrylate dispersion based on 90% of butylacrylate 5% of acrylonitrile and 5% of acrylamide and N-methylol acrylamide, 75 g of a solvent-free melamine-formaldehyde resin (®Cymel 301 of ACC) and 15 g of a 20% solution of 4-toluene sulphonic acid isopropanol.

Comparison coatings produced using a coupling coat paste V2, which has the same composition as coupling coat paste H2 but without the added dispersion, have considerably weaker flexural strength, weaker adhesion and inadequate resistance to dry cleaning.

EXAMPLE 3

The surface coat paste D3 is a 40% PUR-dispersion in water thickened with 2% of polyvinyl pyrrolidone and pigmented with 15% of titanium dioxide, having been produced as follows: 1700 g (1.0 mol) of a mixed polyester of 1,6-hexane diol, neopentyl glycol and adipic acid are reacted with 303 g (1.8 mol) of 1,6-hexane diisocyanate to form an NCO-prepolymer. The NCO-prepolymer thus obtained is converted into the polyester urethane urea by reaction in the form of an aqueous dispersion with 152 g (0.8 mol) of the sodium salt of ethylene diamine ethyl sulphonic acid as chain extender. The coupling boat paste H3 consists of 1000 g of the prepolymer (VII) containing terminal CO—NH$_2$-groups, 200 g of a 40% aqueous NBR latex from 25% of acrylonitrile 70% of butadiene and 5% of N-methylolacrylamide and 150 g of a 50% melamine-formaldehyde resin in butanol (®Maprenal MF 800 of Cassella Company, Germany) together with 12 g of a 20% solution of 4-toluene sulphonic acid in isopropanol.

A textile coating having high resistance to perchlorethylene, outstanding flexural strength and firm adhesion is produced from D3 and H3 in the same way as described in Example 1.

Comparison coatings produced using a coupling coat paste V3, which has the same composition as coupling coat paste H3, but without the added dispersion, show considerably weaker flexural strength, weaker adhesion and inadequate resistance to dry cleaning.

EXAMPLE 4

The surface coat solution D4 is a 30% solution, pigmented with 8% of a paste of organic pigment, polyacrylate and cyclohexanone, of an aliphatic one-component polyester urethane in toluene/isopropanol/ethyl glycol ether acetate (29:29:12) having a viscosity of 22,000 mPas at 25° C. The polyurethane is produced by

| Composition of the coating | Flexural strength (Bally Flexometer) | | Adhesion (N/2.5 cm) (mins. at 25° C.) | Storage in ethylacetate (mins. at 25° C.) | Dry cleaning in perchlorethylene | feel |
| --- | --- | --- | --- | --- | --- | --- |
| | room temperature (in thousands) | −10° C. | | | | |
| D1/H1 | 200 | 50 | 30 | no change | no change | soft |
| D1/V1 | 100 | 20 | 10 | separation from the substrate | heavily damaged | stiff | reacting an NCO-prepolymer of 1700 g (1.0 mol) of the polyester described in Example 3 and 490 g (2.2 mols) of isophorone diisocyanate (IPDI) with 205 g (1.2 mols) of isophorone diamine in solution.

The coupling coat paste H4 consists of 1000 g of the prepolymer (VII) containing terminal CO—NH$_2$-groups, 300 g of the 50% aqueous polyacrylate dispersion used in Example 2 based on butylacrylate, acrylonitrile, acrylamide and N-methylolacrylamide, 75 g of the solvent-free melamine-formaldehyde resin used in Example 1 and 12 g of a 20% solution of 4-toluene sulphonic acid in ethylene glycol monomethyl ether. The procedure and result obtained are the same as described in Example 1. Comparison coatings produced using a coupling coat paste V4 (which has the same composition as coupling coat paste H4, but without the added dispersion) have considerably poorer flexural strength, weaker adhesion, a stiff feel and inadequate resistance to dry cleaning.

EXAMPLE 5

Surface coat paste D5 is identical with D2.

The coupling coat paste H5 is a mixture of 1000 g of the prepolymer (V) containing terminal CO—NH$_2$-groups, 300 g of a 40% aqueous PUR-dispersion of polyol 1, polyol 4, TDI/80, IPDI, hydrazine hydrate and ethylene diamine ethyl sulphonate, also 75 g of solvent-free melamine-formaldehyde resin used in Example 1 and 20 g of a 20% solution of 4-toluene sulphonic acid in isopropanol. As described in Example 1, the surface coat is initially applied, followed by application of the coupling coat paste in a quantity (dry) of 40 g/m$^2$ by means of a cylinder screen printing machine. Comparison coatings produced using a coupling coating paste V5, consisting of coupling coat paste H5 without the added dispersion, have considerably poor flexural strength, weaker adhesion, a stiffer feel and inadequate resistance to dry cleaning.

EXAMPLE 6

Surface coat paste D6 is identical with D2.

The coupling coat paste H6 consists of 1000 g of the prepolymer (IX) containing terminal ketoxime-urethane groups, 200 g of the 40% aqueous polyacrylate dispersion used in Example 1 based on butylacrylate, styrene and N-methylolacrylamide, 75 g of the solvent-free melamine-formaldehyde resin used in Example 1 and 12 g of a 20% solution of 4-toluene sulphonic acid in isopropanol.

The procedure is the same as described in Example 1. Comparison coatings produced using a coupling coat paste V6, consisting of coupling coat paste H6 without the added dispersion, have considerably poorer flexural strength, weaker adhesion, a stiffer feel and inadequate resistance to dry cleaning.

EXAMPLE 7

The surface coat paste D7 is identical with D2.

The coupling coat paste H7 consists of 1000 g of the prepolymer (VIII) containing terminal CO—NH$_2$-groups, 200 g of a 15% casein solution in water, 75 g of the solvent-free melamine-formaldehyde resin used in Example 1 and 12 g of a 20% solution of 4-toluene sulphonic acid in isopropanol.

The procedure is the same as described in Example 1. Comparison coatings produced using a coupling coat paste V7, consisting of coupling coat paste H7 without the aqueous casein solution added, have considerably poorer flexural strength, weaker adhesion, a stiffer feel and inadequate resistance to dry cleaning.

EXAMPLE 8

Surface coat paste D8 is identical with D2.

The coupling coat paste H8 consists of 1000 g of the prepolymer (I) containing terminal OH-groups, 250 g of a 50% aqueous polyacrylate dispersion of ethylacrylate and N-methylolacrylamide (®Plextol BV 401 of Rohm & Haas), 100 g of the solvent-free melamine-formaldehyde resin used in Example 1 and 15 g of a 20% solution of 4-toluene sulphonic acid in water. The procedure is the same as described in Example 1. A textile coating having excellent mechanical properties is obtained.

Comparison coatings produced using a coupling coat paste V8, consisting of coupling coat paste H8 without the added dispersion, have considerably poorer flexural strength, weaker adhesion, a stiffer feel and inadequate resistance to dry cleaning.

EXAMPLE 9

Surface coat paste D9 is identical with D2.

The coupling coat paste H9 consists of 1000 g of the prepolymer (III) containing terminal OH-groups, 250 g of a 40% aqueous PUR-dispersion (produced from 1,5 mol of 1,6-hexane diol/adipic acid polyester (OH-number 130), 0,5 mol of 1,4-butane diol 0,3 mol of the sodium salt of ethylene diamine ethyl sulphonate and 2,5 mol of 1,6-hexane diisocyanate), 75 g of the solvent-free melamine-formaldehyde resin used in Example 1 and 15 g of 20% solution of 4-toluene sulphonic acid in isopropanol.

The procedure is the same as described in Example 1. A textile coating having excellent mechanical properties is obtained.

Comparison coatings produced using a coupling coat paste V9 consisting of coupling coat paste H9 without the added dispersion, have considerably poorer flexural strength, weaker adhesion, a stiffer feel and inadequate resistance to dry cleaning.

EXAMPLE 10

Surface coat paste D10 is identical with D2.

The coupling coat paste H10 consists of 1000 g of prepolymer (II) containing terminal OH-groups, 300 g of the 40% aqueous acrylate dispersion used in Example 1, 75 g of the 40% solvent-free urea-formaldehyde resin used in Example 1 and 15 g of a 20% solution of 4-toluene sulphonic acid in water. The procedure is the same as described in Example 1. A high quality coating is obtained.

Comparison coatings produced using a coupling coat paste V10, consisting of coupling coat paste H10 without the added dispersion, have considerably poorer flexural strength, weaker adhesion, a stiffer feel and inadequate resistance to dry cleaning.

EXAMPLE 11

The coupling coat paste D11 is identical with D2.

The surface coat paste H11 consists of 1000 g of prepolymer (X) containing terminal OH-groups, 100 g of a 40% aqueous polyacrylate dispersion (as in coupling coat H1), 60 g of the solvent-free melamine-formaldehyde resin used in H1 and 15 g of a 20% solution of 4-toluene sulphonic acid in water.

The procedure is the same as described in Example 1. The coated textile obtained is of outstanding quality.

Comparison coatings produced using a coupling coat paste V11, consisting of the coupling coat paste H11 without the added dispersion, have considerably poorer flexural strength, weaker adhesion, a stiffer feel and inadequate resistance to dry cleaning.

EXAMPLE 12

Surface coat paste D12 is identical with D2.

The coupling coat paste H12 consists of 1000 g of a prepolymer containing terminal OH-groups and having an average molecular weight of 22,000 of a weakly branched polyester of adipic acid, diethylene glycol and trimethylol propane (molecular weight: 2500) and a deficit of tolylene diisocyanate, 300 g of an aqueous PUR-dispersion (as described in Example 9), 150 g of a 40% aqueous solution of a melamine-formaldehyde resin (®Cassurit MLP of Cassella Company, Germany) and 5 g of zinc oleate. The general procedure is identical with that described in Example 1.

Comparison coatings produced using a coupling coat paste V12 consisting of coupling coat paste H12 without the added dispersion have considerably poorer flexural strength, weaker adhesion, a stiffer feel and inadequate resistance to dry cleaning.

What is claimed is:

1. A coating composition comprising:
   (a) from about 50 to 95% by weight of an optionally branched urethane-group-containing prepolymer having an average molecular weight of from about 500 to 25,000 which is ionic group free and contains from about 2 to 8 terminal groups selected from the group consisting of OH, $CONH_2$ and ketoxime-urethane groups,
   (b) from about 2 to 20% by weight of a urea-and/or melamine-formaldehyde resin,
   (c) from about 3 to 50% by weight of a stable aqueous polymer dispersion and/or aqueous polymer solution having a solids content of from about 20 to 70% by weight and
   (d) from about 0 to 10% by weight of an organic solvent.

2. The coating composition of claim 1, wherein component (a) is a reaction product of a prepolymer produced from a polyether and/or polyester polyol containing from 2 to 4 hydroxyl groups and having a molecular weight of from about 1000 to 4000 and a polyisocyanate in an NCO/OH-equivalent ratio of from about 1.3:1 to 2.5:1, with a quantity, at least equivalent to the isocyanate groups of the prepolymer of a chain terminator selected from the group consisting of ammonia, urea, an alkanolamine, carbazinic acid hydroxyalkyl ester, hydroxycarboxylic acid hydrazide, carbamic acid hydroxyalkyl ester, hydroxycarboxylic acid amide, aminocarboxylic acid amide and ketoxime.

3. The coating composition of claim 1 or 2, wherein component (a) contains from about 0.3 to 6.0% by weight of terminal OH-groups or from about 0.6 to 10.0% by weight of terminal $CONH_2$-groups or from about 2.0 to 40.0% by weight of terminal ketoxime-urethane groups.

4. The coating composition of claim 1 or 2, wherein component (c) is an aqueous polymer latex based on vinyl and, optionally, diene monomers.

5. The coating composition of claim 1 or 2, wherein component (c) is an aqueous solution of a homopolymer or copolymer of vinyl monomers.

6. The coating composition of claim 1 or 2, wherein component (c) is an aqueous dispersion of a cationic, anionic or non-ionic polyurethane.

7. In a process for coating substrates by applying a polyurethane coating composition to a substrate by the direct or reverse coating process and hardening the coating thus applied with forming or shaping, the improvement comprising coating a substrate with the compositions of claim 1 or 2 and hardening by heating the coated substrate to a temperature of from about 110° to 180° C.

8. The composition of claim 2, wherein component (a) is the reaction product of
   (a) a polyol selected from ethylene glycol adipate and propylene glycol ether,
   (b) an isocyanate selected from toluene diisocyanate and 3,3,5-trimethyl-5-isocyanatomethyl cyclohexyl isocyanate, and
   (c) a chain terminator selected from 1,2-hydroxy propyl urethane, 1,2-hydroxy propyl carbazinic acid ester and methyl ethyl ketoxime.

9. In a process for reverse coating a flexible sheet form substrate wherein a top coat is applied to a release substrate and cured, a coupling coat is then applied to the cured top coat, the substrate applied to the not fully cured coupling coat, the coupling coat cured and the three layer laminate separated from the release substrate, the improvement wherein the coupling coat comprises:
   (a) from about 50 to 95% by weight of an optionally branched urethane-group-containing prepolymer having an average molecular weight of from about 500 to 25,000 which is ionic group free and contains from about 2 to 8 terminal groups selected from the group consisting of OH, $CONH_2$ and ketoxime-urethane groups,
   (b) from about 2 to 20% by weight of a urea- and/or melamine-formaldehyde resin,
   (c) from about 3 to 50% by weight of a stable aqueous polymer dispersion and/or aqueous polymer solution having a solids content of from about 20 to 70% by weight and
   (d) from about 0 to 10% by weight of an organic solvent.

10. In the process of claim 9, the further improvement wherein the coupling coat is cured by heating the coated substrate to a temperature between about 110° and 180° C.

11. In a process for direct coating a flexible sheet form substrate wherein the substrate is coated with an uncured coating composition and the coating is then cured, the improvement wherein said coating comprises:
    (a) from about 50 to 95% by weight of an optionally branched urethane-group containing prepolymer having an average molecular weight of from about 500 to 25,000 which is ionic group free and contains from about 2 to 8 terminal groups selected from the group consisting of OH, $CONH_2$ and ketoxime-urethane groups,
    (b) from about 2 to 20% by weight of a urea- and/or melamine-formaldehyde resin,
    (c) from about 3 to 50% by weight of a stable aqueous polymer dispersion and/or aqueous polymer solution having a solids content of from about 20 to 70% by weight and
    (d) from about 0 to 10% by weight of an organic solvent.

12. In the process of claim 11, the further improvement wherein the coating is cured by heating the coated substrate to a temperature between about 110° and 180° C.

13. The product of the process of claim 7.
14. The product of the process of claim 9.
15. The product of the process of claim 11.

* * * * *